United States Patent [19]
Larsen

[11] 3,789,132
[45] Jan. 29, 1974

[54] COLOR CAMERA SYSTEM HAVING COMPLETE SPECTRAL CHARACTERISTICS

[75] Inventor: Arthur Bertel Larsen, Colts Neck, N.J.

[73] Assignee: Bell Telephone Laboratories, Incorporated, Murray Hill, N.J.

[22] Filed: May 19, 1972

[21] Appl. No.: 255,165

[52] U.S. Cl. .......... 178/5.4 ST
[51] Int. Cl. .......... H04n 9/06
[58] Field of Search .......... 178/5.4 ES, 5.4 ST, 5.4 E, 178/6.8, 7.6, 7.86, 5.4 TC; 350/316, 317

[56] References Cited

UNITED STATES PATENTS

| | | | |
|---|---|---|---|
| 3,688,020 | 8/1972 | Kubota | 178/5.4 ST |
| 3,585,286 | 6/1971 | Macovski | 350/317 |
| 3,566,018 | 2/1971 | Macovski | 178/5.4 ST |
| 3,585,284 | 6/1971 | Macovski | 178/5.4 ST |
| 3,655,909 | 4/1972 | Kubota | 178/5.4 ST |
| 3,378,633 | 4/1968 | Macovski | 178/5.4 ST |

*Primary Examiner*—Richard Murray
*Attorney, Agent, or Firm*—David L. Hurewitz

[57] ABSTRACT

Improved color reproduction is made possible by a television camera exhibiting a complete predetermined camera spectral sensitivity characteristic having both the positive and negative lobes. Materials having transmission characteristics which are responsive to both the positive and inverted negative lobes of the predetermined characteristics are combined to form a single striped optical spatial filter at the camera, and the resultant composite video signal is demodulated to yield a chrominance output signal proportional to the difference between the light transmission provided by the filter stripes so that the prescribed spectral sensitivity characteristic is produced for each output channel. The technique permits a camera to exhibit complete spectral characteristics and to generate by direct optical means any color signal, including I or Q, and it is applicable to single or multiple tube cameras using spatial modulation techniques for color discrimination.

7 Claims, 11 Drawing Figures

COLOR CAMERA SYSTEM HAVING COMPLETE SPECTRAL CHARACTERISTICS

BACKGROUND OF THE INVENTION

This invention relates to color television systems, and more particularly to systems having camera and display apparatus capable of high quality color reproduction.

As is well known, color television cameras convert light from a scene into electrical signals which contain information sufficient to reproduce an image of the scene. For color reproduction three independent signals are needed. They may be three color signals, such as red, green and blue, each representing one of the primary colors, and the image's overall brightness or luminance may be derived from a combination of the three color signals. Alternatively, a luminance signal Y may be used with any one of a number of pairs of chrominance signals, the most conventional of which is a pair consisting of signals designated I and Q.

Color camera systems may take many forms. Multiple image pickup tube arrangements having three or even four pickup devices are common. In addition, there are numerous single-tube cameras (as well as some two-tube cameras) which use color filters composed of a plurality of materials having distinctive transmission characteristics to separate the incoming light into distinct regions of the frequency spectrum, either temporally in the case of a rotating color wheel, or spatially. The color pattern produced on the target of the pickup device by a spatial filter may be a series of periodically repetitive stripes, and the stripes, which are most conventionally oriented transverse to the scanning direction, form a spatially modulated color image for each material of the color filter. When scanned, these images result in a composite video signal in which the different color components are modulated onto high frequency carriers. These may be separated and decoded by any of a variety of techniques.

Every camera exhibits a set of spectral sensitivity characteristics which define the amplitudes of the camera's component output signals as a function of the wavelength of the light input. Whether the camera uses an individual tube for each component signal or a common tube for a plurality of component signals, the most precise color reproduction is produced only if the camera exhibits a specific optimum spectral sensitivity characteristic for each component signal. These optimum characteristics, which may be defined mathematically by conventional techniques, are determined by the known spectral output characteristics of the selected display and the illumination provided at the camera. It is well known that the optimum spectral characteristics normally have both positive and negative lobe portions and the inability of conventional color television camera systems, of both the multiple and single tube types, to reproduce the negative lobes results in colormetric error in the displayed picture.

It is suggested in the literature, such as *The Reproduction of Colour*, by R. W. G. Hunt, John Wiley & Sons, Inc., Second Edition, 1967, p. 80–81, and *Colour Television*, by P. S. Carnt and G. B. Townsend, Iliffe Books, Ltd., 1961, p. 74 and 75, that the negative lobes may be incorporated by the use of additional color receptors, such as tubes, the outputs of which can then be combined with the outputs of the receptors responsive to the more conventional positive lobes. However, this technique for improving colorimetry has been, as indicated in those books, rejected on the grounds that the use of numerous receptors is impractical and for specific closed circuit applications, such as color PICTUREPHONE video telephone, where a single tube is practically a commercial necessity, the requirement of multiple receptors makes such a technique almost useless. Instead, the accepted approaches have been to ignore the negative lobes or to approximate them by electrical matrixing of the outputs derived from the conventional receptors which are sensitive only to positive lobes. The latter matrixing is illustrated in the article by A. H. Jones, entitled "Optimum Color Analysis Characteristics and Matrices for Color Television Cameras With Three Receptors," published in the *Journal of the Society of Motion Picture and Television Engineers*, Vol. 77, February 1968, p. 105. Unfortunately, the electrical matrixing technique inherently results in an approximation and does not provide accurate colorimetry. In addition, it suffers the disadvantage of a reduced signal-to-noise ratio as a result of the electrical matrixing.

It is an object of the present invention to provide high quality color reproduction by providing a camera which exhibits optimized spectral sensitivity characteristics that are complete and hence include both the positive and negative lobes. It is a further object to provide such a camera without increasing the number of pickup tubes in the system.

SUMMARY OF THE INVENTION

In accordance with the present invention, a single-tube camera system is used to generate chrominance signals without electrical matrixing by using spatial modulating striped filters. The filter materials are selected to provide a complete spectral sensitivity characteristic for each of the camera output channels by taking into account both the positive and negative lobes of the desired characteristic. If I and Q signals are generated by the camera, a four-striped filter is constructed. The filter consists of recurring groups of two pairs of complementary stipes, the filter materials of the first pair providing respectively transmissivity characteristics proportional to the positive lobe of the Q signal and the inverted negative lobe of the Q signal, and the materials of the second pair providing respectively transmissivity characteristics proportional to the positive lobe of the I signal and the inverted negative lobe of the I signal. In this embodiment, these four materials are combined to form a single filter of parallel stripes disposed at a common frequency and positioned to form a spatially modulated image on the target which, when scanned, produces a composite video signal. An index signal is also generated by the scanning process and it is used to demodulate the composite signal to yield two independent outputs, each proportional to the difference between the transmission of two complementary stripes of the filter. These output difference signals are the I and Q signals. A baseband luminance signal may be provided from the same composite output or may alternatively be derived from an independent camera tube.

The technique for generating complete characteristics by providing spatial modulation filters appropriate to both the positive and negative lobes of prescribed spectral sensitivity characteristics is also applicable to cameras having alternative optical filter structures and chrominance output signals, and complete characteristics may also be generated by the use of the specific red, green and blue striped filter which produces chrominance signals proportional to the difference between the light transmitted by each color stripe and the average of the light transmitted by all of the stripes.

DETAILED DESCRIPTION

Figure 1:
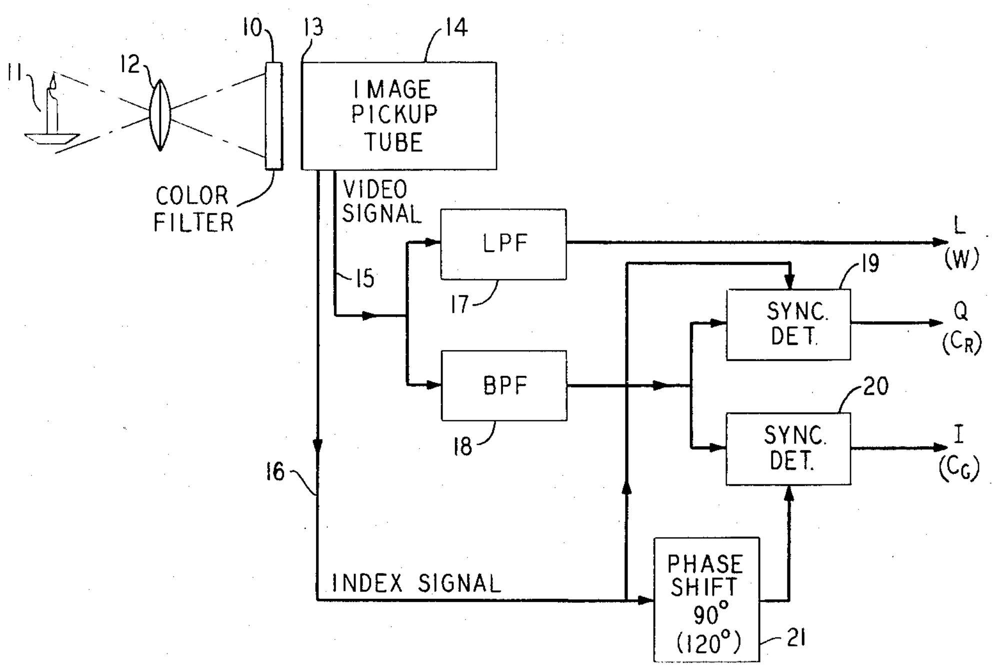
FIG. 1 is a block diagram of a single-tube color television camera system in accordance with the present invention.
Figure 6:
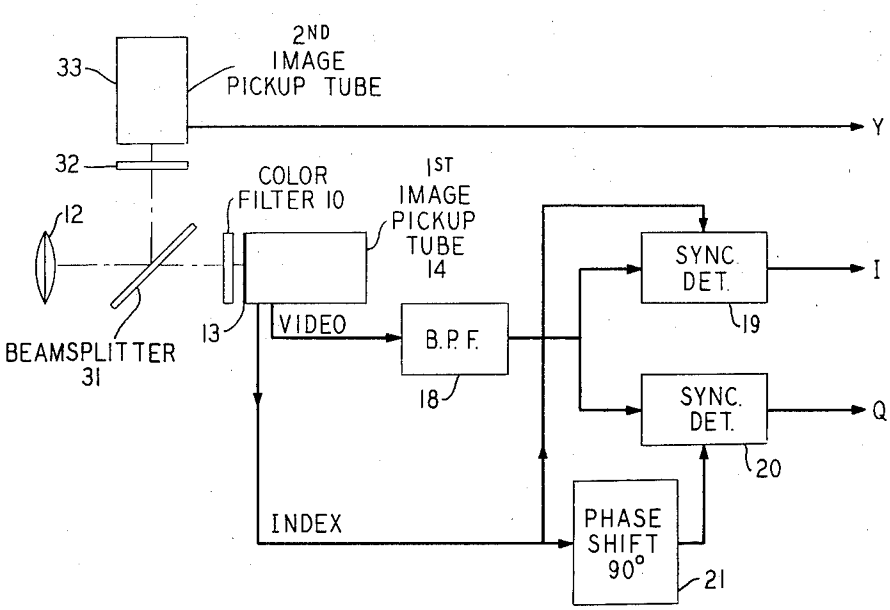
FIG. 6 is a block diagram of an alternative two-tube camera system in accordance with the present invention.

The present invention is directed to improved colormetric response in color television systems, and primarily to cameras using spatial modulation for color discrimination. The invention is particularly well-suited to a single-tube camera embodied as shown in FIG. 1, but alternative embodiments, including the two-tube version of FIG. 6, are also possible. The block diagram of FIG. 1 illustrates a single-tube camera which utilizes objective lens assembly 12 and striped color filter 10 to focus a spatially modulated striped image of object 11 on target 13 of pickup tube 14. Tube 14, which is assumed to be a solid-state target device, may also be a vidicon or any similar image-detecting device which produces a video signal as a result of scanning the image formed on target 13. The tube shown produces two separate outputs represented as a composite video signal on lead 15, and an index signal indicative of the instantaneous position of the camera tube scanning beam on lead 16. In some arrangements, however, both signals may be removed from the tube on a common lead. The index signal may be produced by any of a number of techniques, including the use of an optically overlaid reference image as disclosed in U.S. Pat. No. 3,647,946, issued to L. H. Enloe March 7, 1972, or an independent grid structure internal to tube 14, as disclosed generally in the art and a particular improvement thereof in applicant's copending application (A. B. Larsen Case 8), Ser. No. 230,344, filed Feb. 29, 1972, and assigned to the assignee hereof. Alternatively, the grating pattern of filter 10 may provide recurring reference stripes, but this is not preferred since the additional stripes would adversely affect the tube's resolution.

The composite video signal contains high frequency modulated components which must be demodulated to form the independent chrominance outputs necessary for color reproduction. As shown in FIG. 1, the index signal on lead 16 is utilized for this demodulation, but the invention is also applicable to Kell-type striped filter cameras which do not employ index signals, but which instead arrange the different filter stripes at distinct spatial frequencies, so that the video components may be distinguished by conventional frequency separation. The index type camera is, however, preferred, and as the application of the invention to Kell-type cameras will be apparent to one skilled in the art, no additional discussion of the frequency separation cameras appears necessary.

The operational basis of the camera system is the direct generation of chrominance signals by optical spatial modulation of the image presented to a pickup tube, such as 14. Such signals may be of the type R-Y, G-Y and B-Y, where R, G and B are signals representing respectively the intensity of the primary colors red, green and blue, and Y, which is a linear combination of R, G and B, is a luminance signal representing the overall brightness of the scene. Alternative chrominance signals could be I and Q, which are each distinct linear combinations of R, G and B. The output of each of the three independent channels of the camera, as a function of the wavelength of the incoming light, can be represented by a set of linear combinations of the amplitude responses of idealized red, green and blue channels which would optimally match the color reproduction at the display with the color of the object being televised. These responses, designated as functions of wavelength ($\lambda$), are $R(\lambda)$, $G(\lambda)$ and $B(\lambda)$, and if the camera is designed to generate Y, I and Q, their spectral responses, designated $Y(\lambda)$, $I(\lambda)$ and $Q(\lambda)$, may be expressed as:

$$
\begin{aligned}
Y(\lambda) &= C_1 R(\lambda) + C_2 G(\lambda) + C_3 B(\lambda) \\
I(\lambda) &= C_4 R(\lambda) + C_5 G(\lambda) + C_6 B(\lambda) \\
Q(\lambda) &= C_7 R(\lambda) + C_8 G(\lambda) + C_9 B(\lambda)
\end{aligned} \quad (1)
$$

Figure 2:
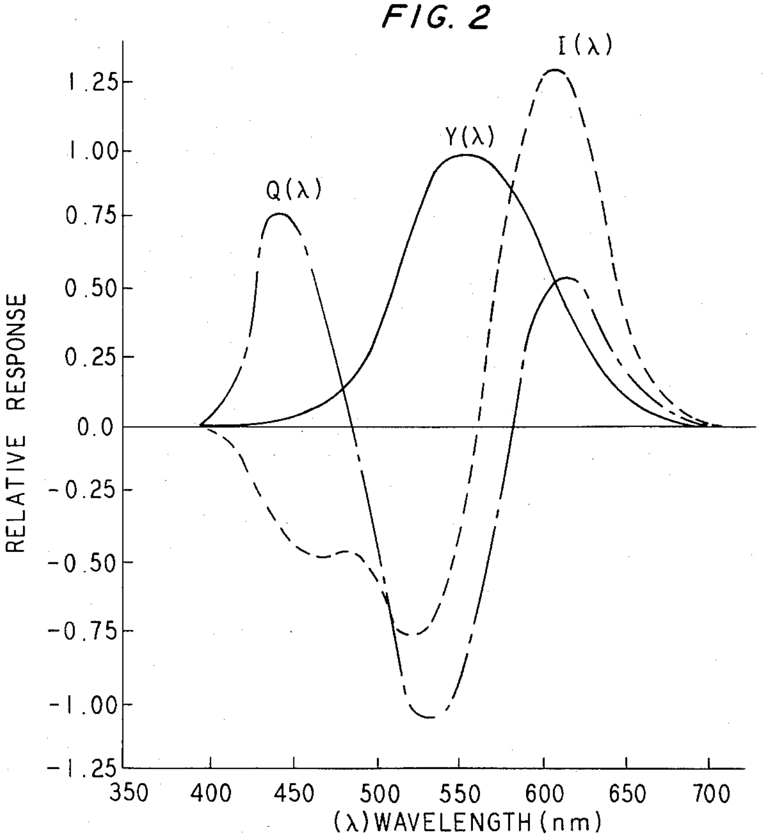
FIG. 2 is a graphical representation of typical spectral sensitivity characteristics for the camera system of FIG. 1.

The optimized spectral characteristics of the luminance and chrominance signals may be ascertained from standard colormetric procedures based upon color-matching functions previously determined for the given display primaries and object illumination. This defines the values of the coefficients $C_1, C_2 \ldots C_9$ for the specific apparatus. FIG. 2 is a graphical representation of an optimized set of spectral characteristics of Equation (1) for a typical camera system.

At the color display the luminance and chrominance signals (Y, I and Q) will be matrixed to produce three signals which are used to control the activation of the display's three primary colors, conventionally red, green and blue, but only if the camera characteristics match the optimized characteristics of Equation (1), will precise color reproduction result at the selected color display. As can be seen from the representative characteristics of FIG. 2, $Y(\lambda)$ is essentially positive as would be expected, but $Q(\lambda)$ and $I(\lambda)$ have significant negative lobes. In fact, the negative area under the curves are approximately equal to the positive area under the curves. Accordingly, to ignore the negative characteristics would result in significant degradation of the color reproduction.

In accordance with the invention, an arrangement for striped filter 10 is selected which results in camera output responses which include these negative lobe portions. For purposes of illustration, the optimized characteristics are assumed to be represented by FIG. 2, and the positive lobes of the $Q(\lambda)$ characteristic ($Q^+$) are shown as the solid curve of FIG. 3A, while the inverted negative lobe of the $Q(\lambda)$ characteristic ($Q^-$) is shown as a solid line in FIG. 3B. Similarly, the positive lobe of the I(λ) characteristic ($I^+$) and the inverted negative lobe ($I^-$) are shown as solid lines in FIGS. 4A and 4B, respectively.

Figure 3A:
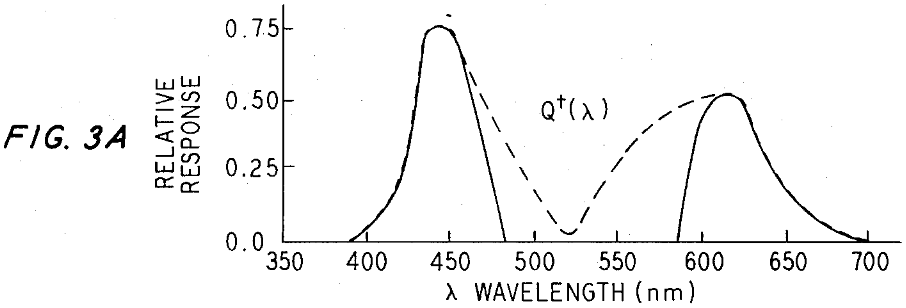
FIGS. 3A, 3B, 4A and 4B are graphical representations of portions of the curves of FIG. 2.
Figure 3B:
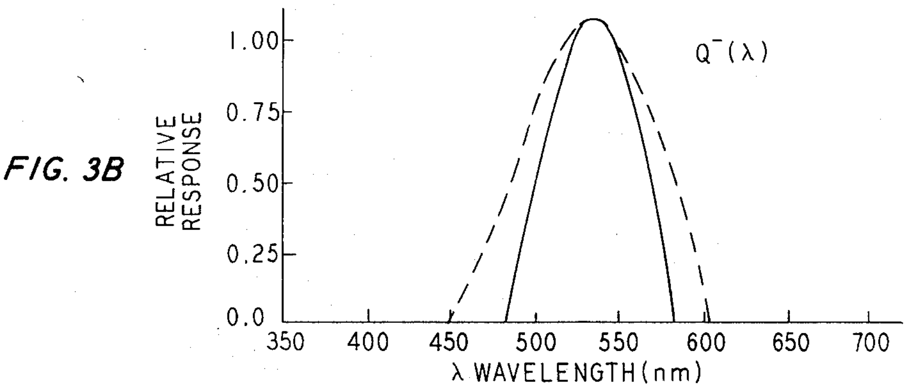

The luminance component Y has no negative portion and can be obtained without spatial modulation. However, spatial modulation is needed to derive the chrominance signals I and Q, and the spectral transmissivities, $T_Q+$ and $T_Q-$, of a realizable pair of grating stripes needed to generate one of the chrominance signals, such as Q, may be given by:

$$T_Q+=\frac{Q^+(\lambda)}{|Q(\lambda)|_{max}}=\frac{Q(\lambda)+|Q(\lambda)|}{2|Q(\lambda)|_{max}}$$

$$T_Q-=\frac{Q^-(\lambda)}{|Q(\lambda)|_{max}}=\frac{|Q(\lambda)|-Q(\lambda)}{2|Q(\lambda)|_{max}} \quad (2)$$

that is, $Q^+(\lambda)$ consists of the positive lobes of Q(λ) as shown in the solid curve FIG. 3A and $Q^-(\lambda)$ is equal to the negative lobe of Q(λ) inverted as shown in solid line FIG. 3B, and the desired transmissivities $T_Q+$ and $T_Q-$ of the two stripes are simply the $Q^+(\lambda)$ and $Q^-(\lambda)$ characteristics normalized to the maximum magnitude of Q(λ).

Figure 4A:
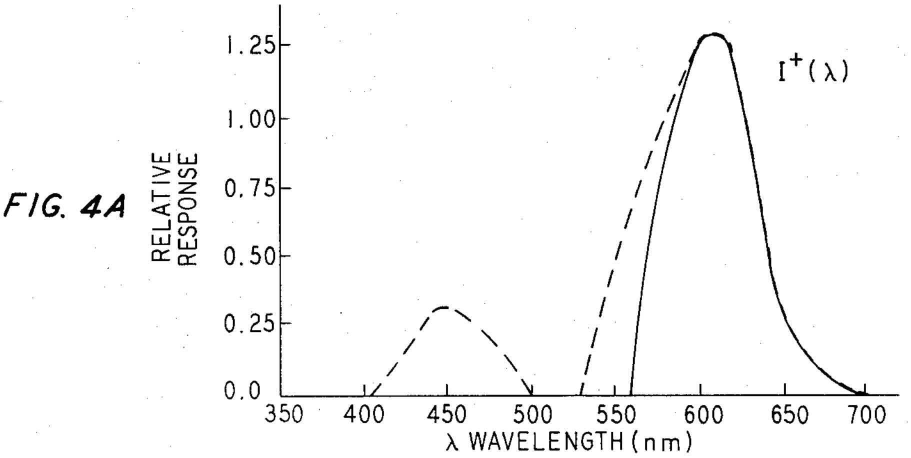
Figure 4B:
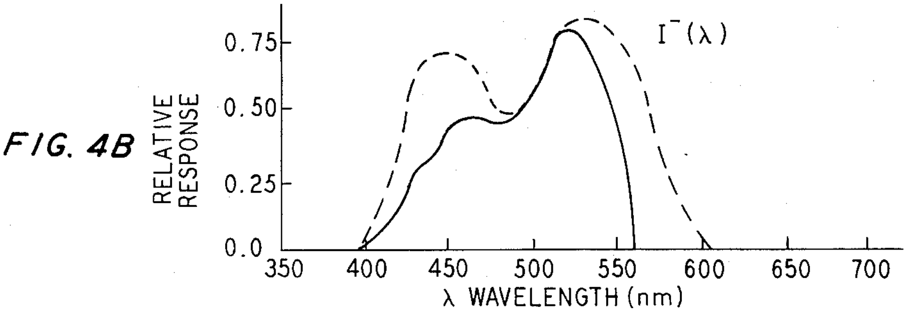

Similarly, a pair of stripes used for the generation of the I signal would consist of alternate stripes having transmissivities:

$$T_I+=\frac{I^+(\lambda)}{|I(\lambda)|_{max}}=\frac{I(\lambda)+|I(\lambda)|}{2|I(\lambda)|_{max}}$$

$$T_I-=\frac{I^-(\lambda)}{|I(\lambda)|_{max}}=\frac{|I(\lambda)|-I(\lambda)}{2|I(\lambda)|_{max}} \quad (3)$$

where $I^+(\lambda)$, the positive portion of I(λ), and $I^-(\lambda)$, the inverted negative portion of I(λ), are represented as the solid line curves in FIGS. 4A and 4B, respectively.

Figure 5:
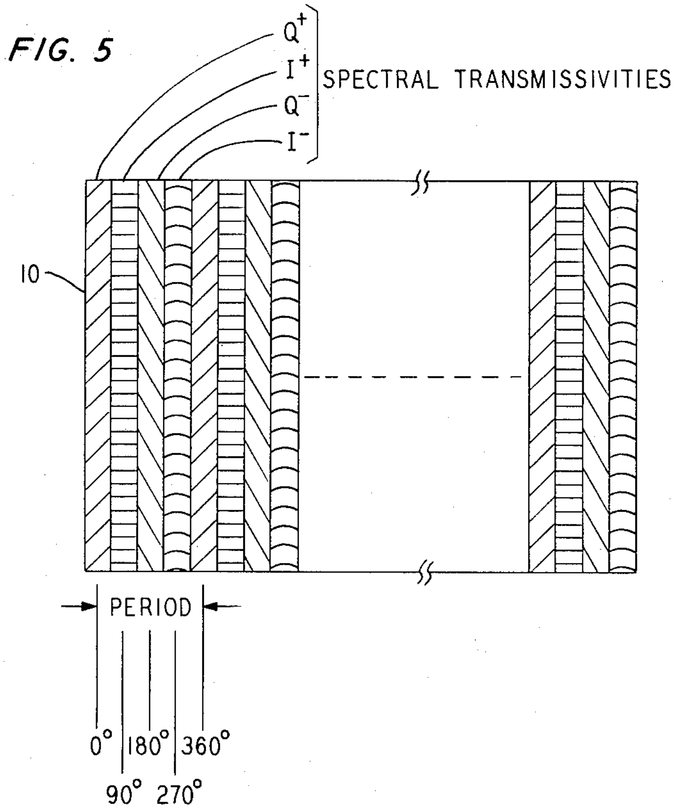
FIG. 5 illustrates a striped color filter for use in FIG. 1 in accordance with one embodiment of the invention.

One specific structure of filter 10 is shown in FIG. 5 and this arrangement consists of periodically recurring groups of four stripes, designated $Q^+$, $I^+$, $Q^-$ and $I^-$. It is preferred that the stripes are all of equal width as shown, but stripes of different widths could also be used. Each stripe consists of a filter material having an optical transmission characteristic (transmissivity) defined by its corresponding expression in Equation (2) or (3). These filters are produced by conventional vacuum deposition or photochemical techniques to exhibit the desired transmissivities.

In order to understand the operation of the filter structure of FIG. 5, assume first a filter having pairs of complementary $Q^+$ and $Q^-$ stripes with all other regions of the filter being opaque. The spatially modulated "$Q^+$ and $Q^-$ images" (those images formed respectively by the light passed by the $Q^+$ and $Q^-$ stripes) will be scanned to produce a high frequency component with an amplitude proportional to the difference between the light transmitted by adjacent $Q^+$ and $Q^-$ stripes. The light transmission is, of course, dependent upon the transmissivities $T_Q+$ and $T_Q-$ of the two stripes and the spectral content of the light falling upon them. If the light intensity transmitted by the $Q^+$ stripe exceeds the light intensity transmitted by the $Q^-$ stripe, the difference signal is designated as positive, while if the intensity transmitted by $Q^-$ exceeds that transmitted by $Q^+$, the difference is designated as negative. The binary determination of which transmission is greater requires the use of a phase reference signal to correlate the output difference signal and the specific stripe being scanned. A baseband low frequency component also produced by the scanning is proportional to the average of the light transmitted by the $Q^+$ and $Q^-$ stripes.

Similarly, a filter having pairs of complementary stripes, alternately $I^+$ and $I^-$, interspersed with opaque regions, will produce a high frequency difference component and a low frequency baseband component. By superposition, the combination of the $Q^+$ and $Q^-$ filter and the $I^+$ and $I^-$ filter forming the interleaved structure shown in FIG. 5, results in two high frequency components, one proportional to the difference between the light transmitted by the $Q^+$ and $Q^-$ stripes, and the other proportional to the difference between the light transmitted by the $I^+$ and $I^-$ stripes.

It can be seen as a result of the geometry of the combined filter that these two high frequency components will be 90° out-of-phase. Accordingly, the high frequency portion of the video signal on lead 15 in FIG. 1 is passed by bandpass filter 18 to synchronous detectors 19 and 20 and as the high frequency components are inherently in quadrature, conventional synchronous detection may be used to separate them if a reference is provided. The required index signal or reference is synchronized with the striped pattern shown in FIG. 5 and may have, for example, a peak positive excursion occurring when the scanning beam is centered on the $Q^+$ stripe. This signal appearing on lead 16 is applied to conventional synchronous detector 19 which produces an output signal Q proportional to the aforementioned difference between the transmissions by the $Q^+$ and $Q^-$ stripes. It is noted that this synchronous detection inherently insures an appropriate polarity designation to the output chrominance signal Q. Detection of the chrominance signal I is accomplished in synchronous detector 20 using the same index signal, but phase shifted by 90° in phase shifter 21 to adjust for the quadrature relationship between the I and Q stripes. The chrominance signal I will, of course, also have a proper polarity designated as a result of the detection process.

The video signal from tube 14 is also lowpass filtered by filter 17 to produce a baseband luminance signal designated L in FIG. 1, and the luminance spectral transmissivity of the filter will be equal to the average transmission of all four stripes. For four equal-width filter stripes having transmissivities $T_I+$, $T_I-$, $T_Q+$, and $T_Q-$, the filter's equivalent spectral transmissivity, $T_L$, as seen by the baseband signal may be expressed as:

$$T_L = (T_I+ + T_I- + T_Q+ + T_Q-)/4 \quad (4)$$

The resultant baseband signal is a form of luminance, but is designated L rather than Y since its corresponding spectral characteristic L(λ) is not equal to Y(λ) and further is not typically representable as a linear combination of R(λ), B(λ) and G(λ), as is Y(λ). However, if the same incremental function $\Delta_1(\lambda)$ of spectral transmissivity is added to the $Q^+$ and $Q^-$ stripes, the light transmission difference would remain constant, therefore producing no change in the output chrominance signal Q. Similarly, an incremental change function $\Delta_2(\lambda)$ may be imposed upon the transmissivities of $I^+$ and $I^-$ stripes, and would likewise have no effect upon the output chrominance signal I. These incremental changes do, however, affect the luminance transmissivity of color filter 10 and result in a new luminance transmissivity, $T_{Y'}$, given by:

$$T_{Y'} = T_L + [\Delta_1(\lambda)]/2 + [\Delta_2(\lambda)]/2 . \quad (5)$$

By appropriate choice of $\Delta_1(\lambda)$ and $\Delta_2(\lambda)$, the original luminance characteristic $L(\lambda)$ can be modified to produce $Y'(\lambda)$, which is a linear combination of $R(\lambda)$, $G(\lambda)$ and $B(\lambda)$. This modification can be accomplished by creating a filter of the FIG. 5 type with the complementary $Q^+$ and $Q^-$ stripes having their transmissivities $T_Q+$ and $T_Q-$ each increased by $\Delta_1(\lambda)$, and the other pair of complementary stripes having their transmissivities $T_I+$ and $T_I-$ increased by $\Delta_2(\lambda)$. The choice of the incremental functions $\Delta_1(\lambda)$ and $\Delta_2(\lambda)$ is to some extent a matter of design choice and empirical evaluation, and a representative set of "corrected" transmissivity characteristics is symbolized by modified spectral transmission characteristic components (to which the transmissivities are proportional) shown as dotted curves in FIGS. 3A, 3B, 4A and 4B. The dotted curves shown are, however, merely representative and not necessarily drawn to scale.

The camera of FIG. 1 having a filter incrementally corrected in such a manner would have spectral sensitivity characteristics represented as:

$$Y'(\lambda) = C_1' R(\lambda) + C_2' G(\lambda) + C_3' B(\lambda)$$
$$I(\lambda) = C_4 R(\lambda) + C_5 G(\lambda) + C_6 B(\lambda)$$
$$Q(\lambda) = C_7 R(\lambda) + C_8 G(\lambda) + C_9 B(\lambda). \quad (6)$$

These equations are essentially similar to Equation (1), the only difference being in the luminance component $Y'(\lambda)$, whose coefficients $C_1'$, $C_2'$ and $C_3'$ are determined by the transmissivity $T_{Y'}$. If it is desired to have a perfectly compatible monochrome Y in lieu of the luminance varient Y', a second tube for direct generation of Y by means of a uniform (non-spatially modulating) filter would be required. A block diagram of such a system is shown in FIG. 6. Since that system is substantially the same as the system of FIG. 1, all similar elements bear the same designation and only beamsplitter 31, uniform filter 32 and a second pickup tube 33 for production of Y have been added.

The direct generation of chrominance signals derived from a filter having transmission characteristics responsive to both the positive and negative lobes will generate complete camera spectral characteristics and if the selected characteristics are optimized, precise color reproduction will result. It will be seen that while the direct generation of I and Q signals is possible using a filter having a recurring pattern of $Q^+$, $I^+$, $Q^-$ and $I^-$ stripes as shown in FIG. 5, the technique for reproducing both positive and negative lobes with a spatial modulation camera could be applied to luminance and chrominance signals of arbitrary composition. In addition, it is noted that the optimized coefficients $C_1$ through $C_9$ of Equation (1) are determined by the specified characteristics of the display and the camera illumination and as these coefficients do not affect the operation of the spatial modulation, the invention is applicable to systems having any display primaries and any camera illumination.

Figure 7:
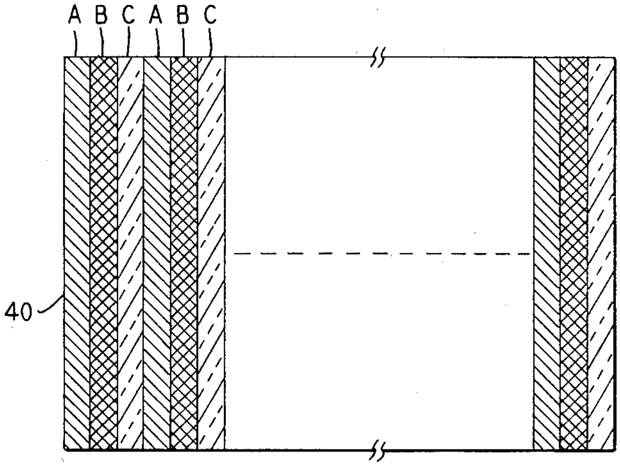
FIG. 7 illustrates an alternative filter configuration for use in the camera system of FIG. 1, and FIGS. 8A and 8B are vector diagrams useful in explaining the operation of the invention with the filter of FIG. 7.

The main impetus for using a single-tube camera is to simplify the system as much as possible and while filter 10 may be a four-striped filter as shown in FIG. 5, it can be replaced by filter 40, a three-striped version represented in FIG. 7.

Figure 8A:
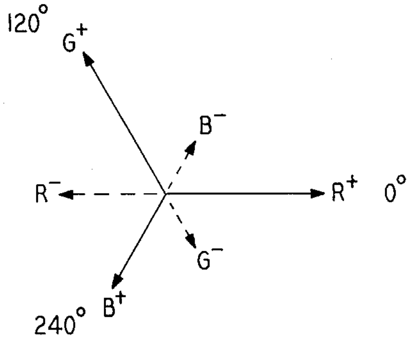

The three recurring stripes are designated A, B and C, and one choice for their individual transmissivities would be to make each correspond to one of the three primary color-matching functions $R(\lambda)$, $B(\lambda)$ and $G(\lambda)$. As was the case with regard to the I and Q signals, these stripes are produced with transmissivities corresponding to the optimized spectral characteristics for the particular system, and as before, in order to assure complete spectral characteristics it is necessary to take the negative lobes of the characteristic into account. Thus, each color-matching function is divided into its positive and negative portions:

$$R(\lambda) = R^+(\lambda) - R^-(\lambda)$$
$$G(\lambda) = G^+(\lambda) - G^-(\lambda)$$
$$B(\lambda) = B^+(\lambda) - B^-(\lambda) \quad (7)$$

where $R^+(\lambda)$, $R^-(\lambda)$, etc. are defined analogously to $Q^+(\lambda)$ and $Q^-(\lambda)$, etc. of Equation (1). If the transmissivities of the A, B and C stripes are made to correspond to normalized versions of $R^+(\lambda)$, $G^+(\lambda)$ and $B^+(\lambda)$, respectively, the carrier signals that would be generated in scanning the intensity pattern transmitted by the filter can be represented as 120° phase-separated phasors as shown by the solid vectors in FIG. 8A. If the negative lobes could be made to generate phasors respectively out-of-phase with their positive counterparts, as indicated by the dotted vectors in FIG. 8A, synchronous detection process could generate the desired difference outputs, that is, $R^+ - R^-$, $G^+ - G^-$, and $B^+ - B^-$.

Hence, the desired $R^-$ component could be generated by adding to the original filter of FIG. 7 a set of stripes having a transmissivity of $R^-(\lambda)$ and located spatially 180° out-of-phase with the A stripes having $R^+(\lambda)$ transmissivities. This would make the $R^-(\lambda)$ stripes overlap adjacent halves of each of the B and C stripes. Repeating this process for the $G^-(\lambda)$ and $B^-(\lambda)$ terms results in a filter having three pairs of stripe sets or six different stripe sets.

Figure 8B:
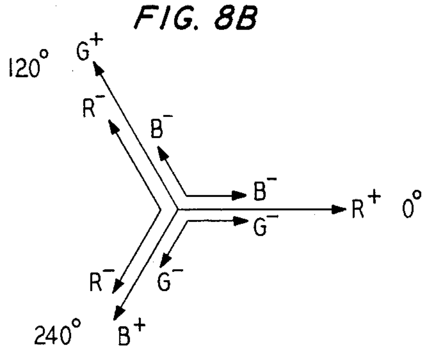

However, in lieu of this optical maze the $R^-$ vectors can also be generated by summing two equal amplitude $R^-$ vectors located at ±60° from the original $R^-$ vector position. This is shown for each of the original three negative components in the vector diagram of FIG. 8B, which is equivalent to the diagram of FIG. 8A. Accordingly, the six negative vectors in FIG. 8B all lie along the original three positive vectors, which means that only three different stripe transmissivities $T_A(\lambda)$, $T_B(\lambda)$ and $T_C(\lambda)$ are required for the stripes A, B and C, respectively; these are given by:

$$T_A(\lambda) = R^+(\lambda) + G^-(\lambda) + B^-(\lambda)$$
$$T_B(\lambda) = G^+(\lambda) + R^-(\lambda) + B^-(\lambda)$$
$$T_C(\lambda) = B^+(\lambda) + R^-(\lambda) + B^-(\lambda) \quad (8)$$

If filter 40 having these transmissivities were used in FIG. 1, synchronous detection of the video signal with respect to the $R^+$+$B^-$+$G^-$ composite vector (at a reference angle of O degrees) would yield an output signal $C_R$ given by $$c_R = R^+ + B^- + G^- - \tfrac{1}{2}(G^+ + B^- + R^-) - \tfrac{1}{2}(B^+ + G^- + R^-) = 3/2\,(R - W), \quad (9)$$

where W is the baseband component:

$$W = 1/3\,(R + G + B). \quad (10)$$

Similar synchronous detection with respect to the $G^+ + R^- + B^-$ vector composite (at 120°) and the $B^+ + R^- + G^-$ vector composite (at 240°) would produce:

$$C_G = 3/2\,(G - W) \quad (11)$$

$$C_B = 3/2\,(B - W). \quad (12)$$

These signals $C_R$, $C_G$ and $C_B$ are in the conventional form of color difference signals, with the exception that W is substituted for the usual Y, and the detection processing of FIG. 1 can produce W, $C_R$ and $C_G$, for instance, in place of Y, Q and I, respectively, by the single expedient of introducing as indicated by the alternative parenthetical designations a 120° phase shift in shifter 21 in lieu of the 90° shift used to generate the quadrature I and Q signals.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A color television camera exhibiting complete preselected spectral sensitivity characteristics comprising:

a primary pickup tube for scanning a target and generating a composite video signal in response to an image of a scene focused upon its target, striped filter means having a pattern of stripes including a recurring interleaved pattern of two pairs of complementary stripes, the first pair having transmissivities as functions of wavelength, λ, being $I^+(\lambda)$ and $I^-(\lambda)$, and the second pair having transmissivities as functions of wavelength, λ, being $Q^+(\lambda)$ and $Q^-(\lambda)$, where $I^+(\lambda)$ and $Q^+(\lambda)$ are respectively the positive lobe portions of the preselected spectral sensitivity characteristics of a first and second chrominance channels of the camera and $I^-(\lambda)$ and $Q^-(\lambda)$ are respectively the inverted negative lobe portions of the preselected spectral sensitivity characteristics of the first and second chrominance channels of the camera, said filter means being positioned to form on the target of the pickup tube a spatially modulated striped pattern of the scene so that the video signal includes a high frequency modulated portion, and means for detecting the composite video signal to produce two outputs, proportional respectively to the difference of light transmitted by the two stripes of the first pair of complementary stripes and the difference of light transmitted by the two stripes of the second pair of complementary stripes.

2. A color television camera as claimed in claim 1 wherein said spectral sensitivity characteristics are selected in accordance with the illumination at the camera tube and the characteristics of the display to which the camera output is to be applied to optimally match the color reproduction at the display with the color of the scene.

3. A color television camera as claimed in claim 2 wherein the four repetitive stripes of the filter means are positioned at a common frequency transverse to the scanning direction and arranged so that each stripe of one complementary pair is adjacent the two stripes of the other complementary pair, means are included for producing an index signal to provide correlation between the video signal and the specific stripe being scanned, and said detection means includes a bandpass filter for separating from the composite video signal the high frequency modulated portion, two synchronous detectors, each for producing from the high frequency modulated portion one of the outputs, the first detector utilizing the index signal as its reference, and the second detector utilizing the index signal shifted in phase as its reference.

4. A color television camera as claimed in claim 3 further comprising a lowpass filter for separating from the composite video signal a baseband signal representative of the average light transmitted by all of the stripes.

5. A color television camera as claimed in claim 4 wherein the transmissivities of both stripes of the first complementary pair of stripes include in common a first incremental function and the transmissivities of both stripes of the second complementary pair include a common second incremental function, the incremental function being chosen such that the baseband signal is a linear combination of red, green and blue primary color signals.

6. A color television camera as claimed in claim 3 further comprising an auxiliary pickup tube for generating independent of the primary pickup tube a luminance output signal representative of the brightness of the scene.

7. A color television camera exhibiting a complete preselected spectral sensitivity characteristic for at least one of its output channels comprising:

a pickup tube for scanning the target and generating a composite video signal in response to an image of a scene focused upon the target, striped filter means having three stripes, each having a different transmissivity characteristic, arranged in a repetitive pattern and positioned to form on the target of the pickup tube a spatially modulated pattern of the scene so that the video signal includes a modulated high frequency portion generated by scanning the spatially modulated pattern, the transmissivities of the three stripes as functions of wavelength, λ, being respectively, $R^+(\lambda) + G^-(\lambda) + B^-(\lambda)$, $G^+(\lambda) + R^-(\lambda) + B^-(\lambda)$, and $B^+(\lambda) + R^-(\lambda) + G^-(\lambda)$ where $R^+(\lambda)$, $G^+(\lambda)$ and $B^+(\lambda)$, are respectively the positive lobe portions of the preselected spectral sensitivity characteristics of the red, green and blue channels of the camera and $R^-(\lambda)$, $G^-(\lambda)$ and $B^-(\lambda)$ are respectively the inverted negative lobe portions of the preselected spectral sensitivity characteristic of the red, green and blue channels of the camera, means for producing an index signal to provide a correlation between the video signal and the location of the stripes, and detection means including filter means for separating from the composite video signal the high frequency modulated portion, and at least two synchronous detectors, each for producing from the high frequency modulated portion a chrominance output signal proportional to the signed difference between the light transmitted by one of the stripes and the average of the light transmitted by all of the stripes, the first detector utilizing the index signal as its reference and the second detector utilizing the index signal shifted in phase as its reference.

* * * * *